US010449645B2

(12) United States Patent
Asano

(10) Patent No.: US 10,449,645 B2
(45) Date of Patent: Oct. 22, 2019

(54) MACHINE TOOL

(71) Applicant: FANUC CORPORATION, Yamanashi (JP)

(72) Inventor: Keita Asano, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/920,500

(22) Filed: Mar. 14, 2018

(65) Prior Publication Data

US 2018/0264608 A1    Sep. 20, 2018

(30) Foreign Application Priority Data

Mar. 17, 2017 (JP) ................................ 2017-052131

(51) Int. Cl.
*B23Q 11/00* (2006.01)
*B23Q 1/40* (2006.01)
(Continued)

(52) U.S. Cl.
CPC ............ *B23Q 1/40* (2013.01); *B23Q 11/0075* (2013.01); *B23Q 11/10* (2013.01); *B23Q 1/0018* (2013.01);
(Continued)

(58) Field of Classification Search
CPC .. B23Q 1/0009; B23Q 1/0018; B23Q 1/0027; B23Q 1/0036; B23Q 1/40;
(Continued)

(56) References Cited

U.S. PATENT DOCUMENTS 2,379,405 A * 7/1945 Armitage .................. B23C 3/00
                                                      409/135
2,653,517 A * 9/1953 Pigott ...................... B24B 55/02
                                                      239/126
(Continued)

FOREIGN PATENT DOCUMENTS

JP      56-121536 U    9/1981
JP      4164541 A      6/1992
(Continued)

OTHER PUBLICATIONS

English Machine Translation for Japanese Publication No. 56-121536 U, published Sep. 16, 1981, 5 pages.
(Continued)

*Primary Examiner* — Eric A. Gates
*Assistant Examiner* — Chwen-Wei Su
(74) *Attorney, Agent, or Firm* — Fredrikson & Byron, P.A.

(57) ABSTRACT

A machine tool is equipped with a second supply pipe having elasticity and having one end side fixed to a spindle head and the other end side fixed to an arm portion, a cover provided within a machining area, and rollers. When the spindle head is moved in a direction to come close to the arm portion, the second supply pipe is bent and then a portion of the second supply pipe is brought into abutment against the cover. The rollers are provided at a portion of the cover against which the second supply pipe is brought into abutment, and are configured to reduce friction between the cover and the second supply pipe when the second supply pipe moves relative to the cover in an abutment state against the cover.

10 Claims, 10 Drawing Sheets

(51) Int. Cl.
*B23Q 11/10* (2006.01)
*B23Q 1/00* (2006.01)
*B23Q 11/08* (2006.01)

(52) U.S. Cl.
CPC .......... *B23Q 11/08* (2013.01); *B23Q 11/1076* (2013.01); *Y10T 409/30392* (2015.01)

(58) Field of Classification Search
CPC . B23Q 11/0028; B23Q 11/0075; B23Q 11/10; Y10T 408/30392; Y10T 409/30392
USPC ...................................................... 248/49, 51
See application file for complete search history.

(56) References Cited

U.S. PATENT DOCUMENTS

| | | | | |
|---|---|---|---|---|
| 4,054,975 | A | * | 10/1977 | Lundstrom ............. B23B 3/161 29/27 C |
| 4,057,881 | A | * | 11/1977 | Stephens ................ B23B 3/161 29/27 C |
| 5,896,794 | A | * | 4/1999 | Trautmann ........... B23Q 1/0009 82/126 |
| 2005/0032615 | A1 | | 2/2005 | Sato et al. |

FOREIGN PATENT DOCUMENTS

| | | | |
|---|---|---|---|
| JP | 680530 | U | 11/1994 |
| JP | 10146735 | A | 6/1998 |
| JP | 200552948 | A | 3/2005 |
| JP | 2010-162646 | A | 7/2010 |
| JP | 2011-112143 | A | 6/2011 |
| JP | 2013-035113 | A | 2/2013 |
| JP | 2016-201928 | A | 12/2016 |

OTHER PUBLICATIONS

English Abstract and Machine Translation for Japanese Publication No. 2011-112143 A, published Jun. 9, 2011, 11 pages.
English Abstract and Machine Translation for Japanese Publication No. 2013-035113 A, published Feb. 21, 2013, 10 pages.
English Abstract and Machine Translation for Japanese Publication No. 2010-162646 A, published Jul. 29, 2010, 9 pages.
English Abstract and Machine Translation for Japanese Publication No. 2016-201928 A, published Dec. 1, 2016, 12 pages.
English Abstract for Japanese Publication No. 2005052948 A, published Mar. 3, 2005, 2 pgs.
English Abstract and Machine Translation for Japanese Publication No. 10-146735 A, published Jun. 2, 1998, 6 gs.
English Abstract and Machine Translation for Japanese Publication No. 06-080530 U, published Nov. 15, 1994, 15 pgs.
English Abstract and Machine Translation for Japanese Publication No. 04-164541 A, published Jun. 10, 1992, 5 gs.

* cited by examiner

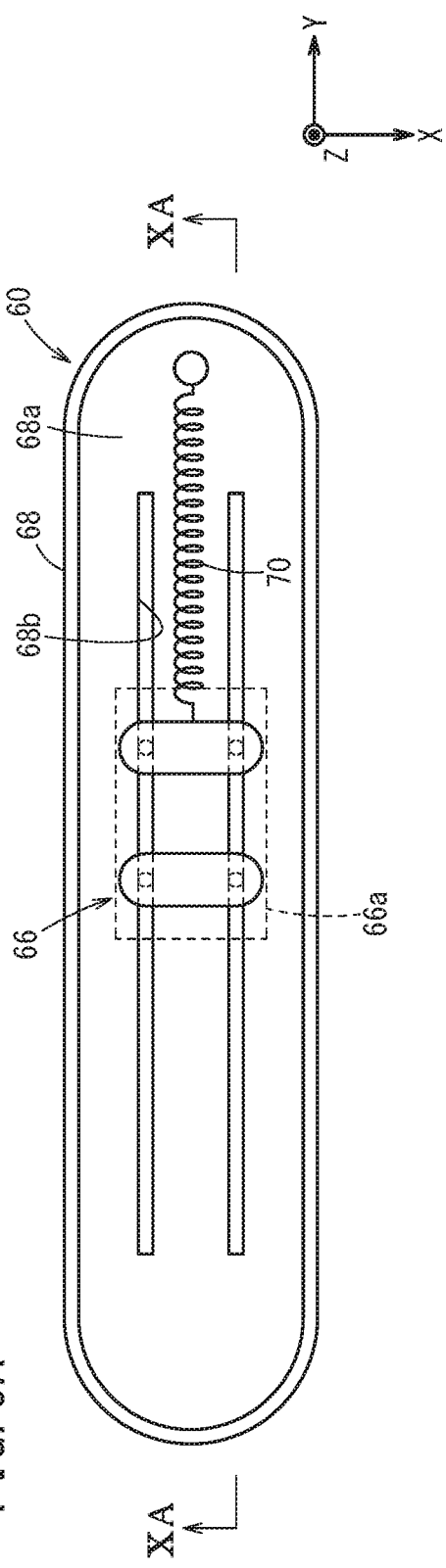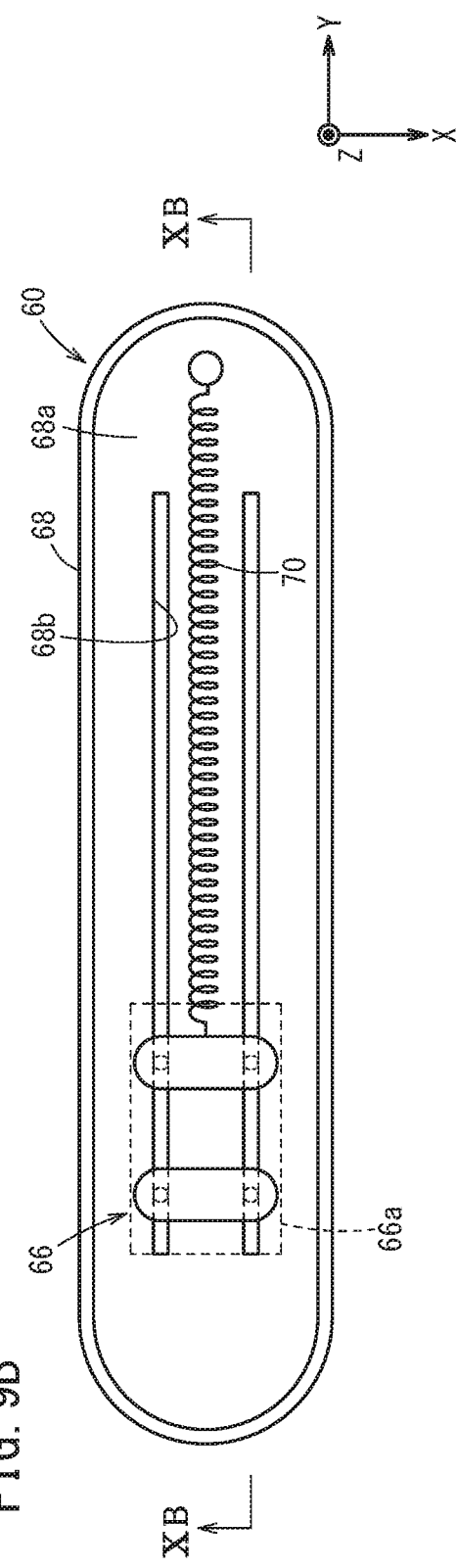

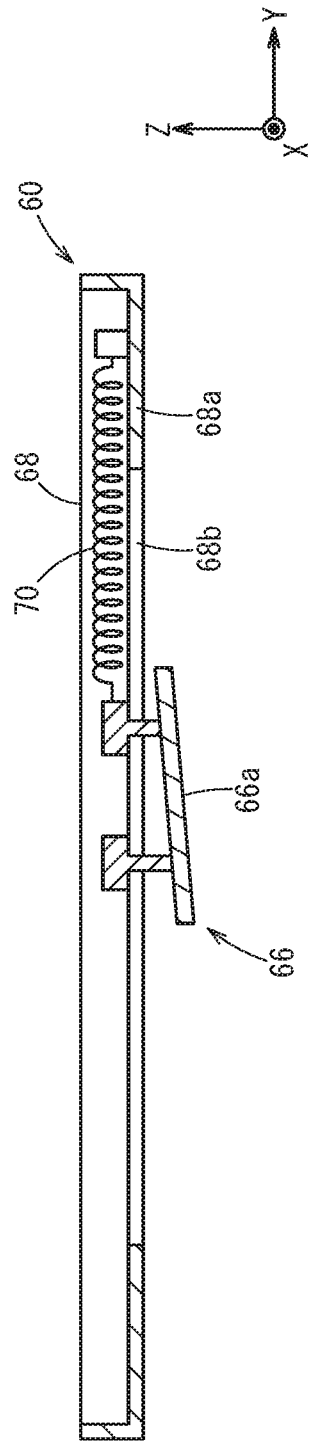
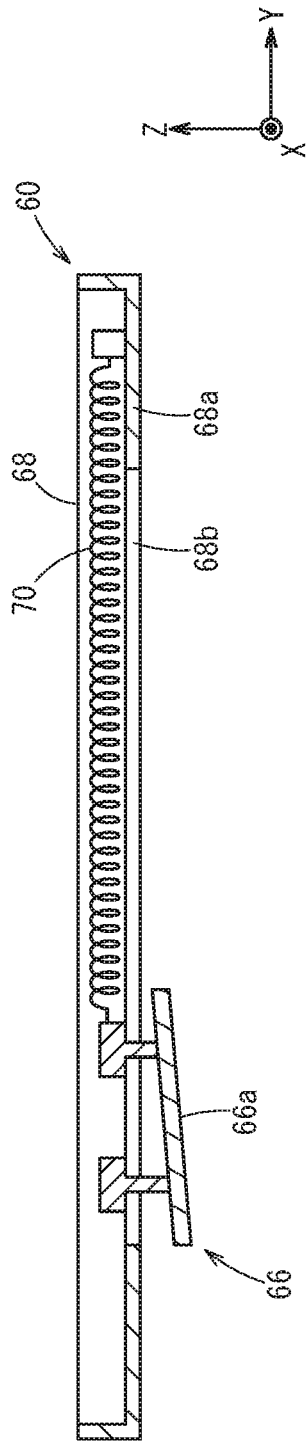

MACHINE TOOL

CROSS-REFERENCE TO RELATED APPLICATION

This application is based upon and claims the benefit of priority from Japanese Patent Application No. 2017-052131 filed on Mar. 17, 2017, the contents of which are incorporated herein by reference.

BACKGROUND OF THE INVENTION

Field of the Invention

The present invention relates to a machine tool.

Description of the Related Art

Japanese Laid-Open Patent Publication No. 2005-052948 discloses a technique in which one end of a coolant supply pipe is fixed to a spindle head while the other end thereof is fixed to a supporting column, and coolant supplied through the coolant supply pipe is ejected from a tool cooling nozzle toward a machining area.

SUMMARY OF THE INVENTION

In the technique disclosed in Japanese Laid-Open Patent Publication No. 2005-052948, because one end of the coolant supply pipe (line-shaped member or cord-like member) is fixed to the spindle head, an intermediate portion of the coolant supply pipe is held in a bent state so that the coolant supply pipe can follow the vertical movement of the spindle head. Further, the coolant supply pipe is made of a material having such elasticity that the intermediate portion may not hang down toward a machining area side. With this configuration, if the spindle head is moved upward, then the intermediate portion of the coolant supply pipe abuts against a ceiling portion of a cover covering the machining area, and consequently the coolant supply pipe is liable to worn and damaged.

The present invention has been made to solve the aforementioned problem, and it is an object of the present invention to provide a machine tool capable of suppressing abrasion of a line-shaped member.

In one aspect of the present invention, a machine tool includes a moving portion configured to move within a machining area, a fixed portion provided within the machining area, a line-shaped member having elasticity, the line-shaped member having one end side fixed to the moving portion and the other end side fixed to the fixed portion, and an interference portion provided within the machining area, wherein when the moving portion is moved in a direction to come close to the fixed portion, the line-shaped member is bent and then a portion of the line-shaped member is brought into abutment against the interference portion, wherein a friction reduction portion is provided at a portion of the interference portion against which the line-shaped member is brought into abutment, and is configured to reduce friction between the interference portion and the line-shaped member when the line-shaped member is moved relative to the interference portion in a state of being held in abutment against the interference portion.

According to the present invention, it is possible to suppress abrasion of the line-shaped member.

The above and other objects, features and advantages of the present invention will become more apparent from the following description when taken in conjunction with the accompany drawings, in which preferred embodiments of the present invention are shown by way of illustrative examples.

BRIEF DESCRIPTION OF THE DRAWINGS

FIG. 9A is a view showing a friction reduction mechanism of the second embodiment when viewed from a Z-axis positive-direction side (i.e., from an upper side);

FIG. 9B is a view showing the friction reduction mechanism of the second embodiment when viewed from the Z-axis positive-direction side;

FIG. 10A is a sectional view of the friction reduction mechanism taken along the XA-XA line in FIG. 9A; and FIG. 10B is a sectional view of the friction reduction mechanism taken along the XB-XB line in FIG. 9B.

DESCRIPTION OF THE PREFERRED EMBODIMENTS

Hereinafter, the present invention will be described based on preferred embodiments with reference to the accompanying drawings. It is to be noted that the following embodiments do not limit the present invention defined in the claims. It is also to be noted that all combinations of features described in the following embodiments are not necessarily essential to the solutions of the present invention.

[First Embodiment]

[Configuration of Machine Tool]

A machine tool 10 according to a first embodiment will be described. The machine tool 10 is a vertical machining center and machines a machining object (not shown: hereafter referred to simply as "workpiece") with a cutting tool 14 attached to a spindle 12 while a spindle head (moving portion) 16 rotatably supporting the spindle 12 is moved downward. Further, at times other than machining, the machine tool 10 moves the spindle head 16 upward to thereby retract the cutting tool 14 from the workpiece.

Figure 1:
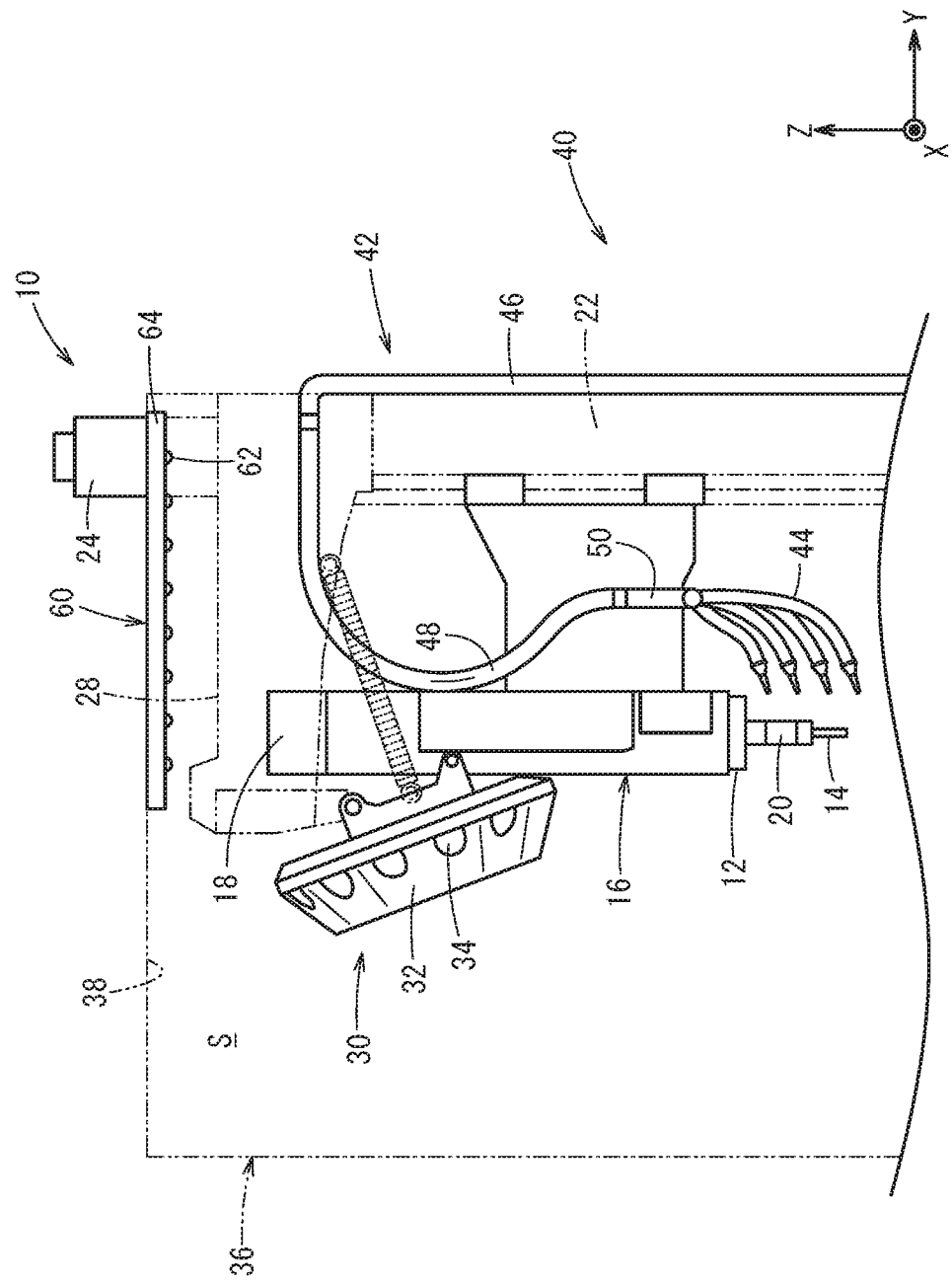
FIG. 1 is a schematic view showing a vicinity of a spindle head of a machine tool according to a first embodiment of the present invention.
Figure 2:
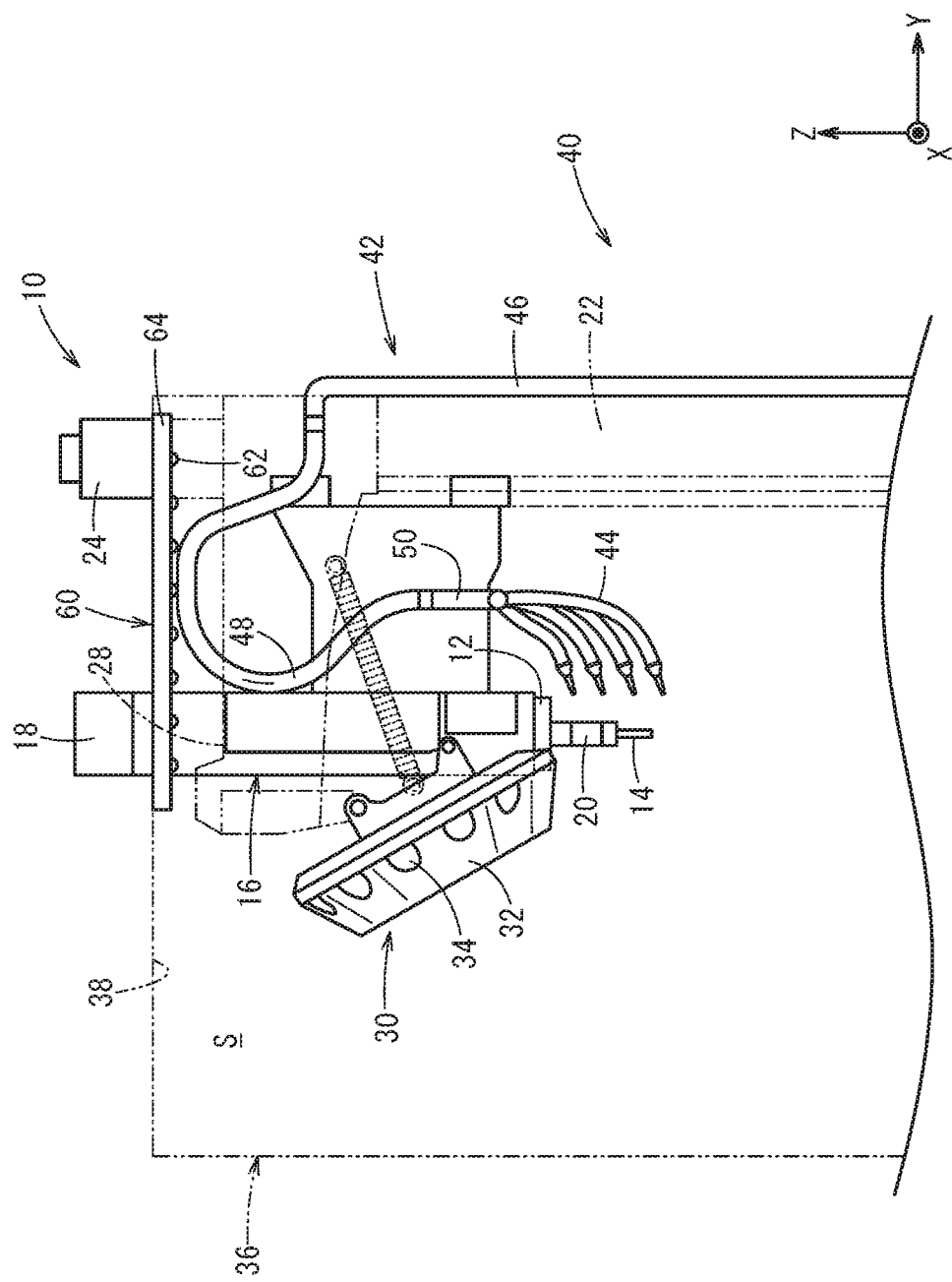
FIG. 2 is a schematic view showing a vicinity of the spindle head of the machine tool of the first embodiment.
Figure 3:
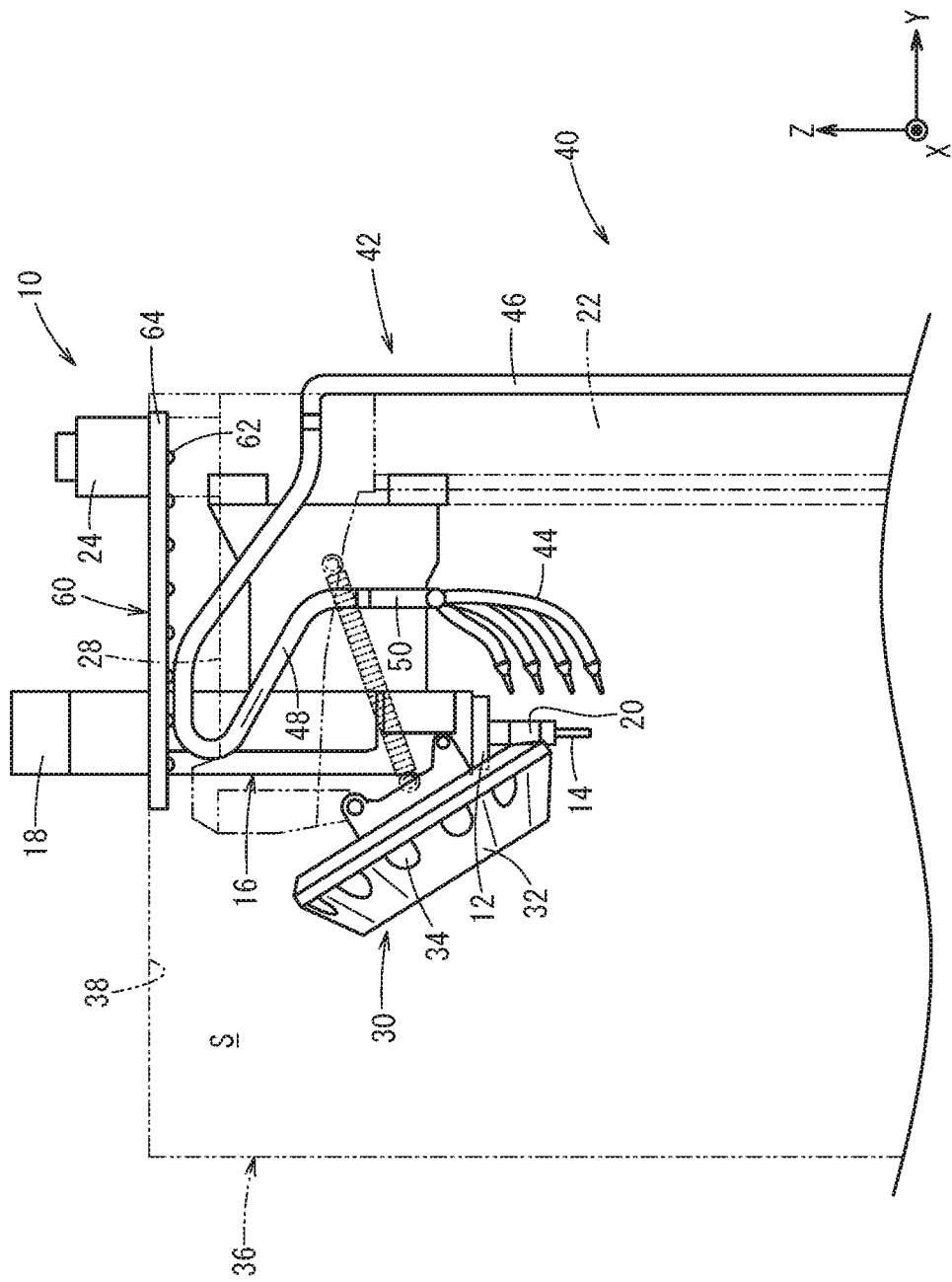
FIG. 3 is a schematic view showing the vicinity of the spindle head of the machine tool of the first embodiment.

FIGS. 1 to 3 are schematic views showing the vicinity of the spindle head 16 of the machine tool 10. FIG. 1 is a view showing a state that the spindle head 16 is lowered for machining the workpiece with the cutting tool 14. FIG. 3 is a view showing another state that the spindle head 16 is lifted for retracting the cutting tool 14 from the workpiece. FIG. 2 is a view showing an intermediate state of the spindle head 16 being moved from the state of FIG. 1 to the state of FIG. 3 or from the state of FIG. 3 to the state of FIG. 1. FIGS. 1 to 3 are each a view of the machine tool 10 as viewed from one side.

In the following description, the right-left direction in FIGS. 1 to 3 is defined as a Y-axis direction, and the rightward direction in the figures is defined as a positive-direction. Further, a direction perpendicular to the Y-axis in a horizontal plane is defined as an X-axis direction, and a direction that is directed out of the drawing sheet is defined as a positive-direction. Furthermore, a direction perpendicular to the X-axis and the Y-axis is defined as a Z-axis direction, and the upward direction in the figures is defined as a positive-direction. Further, when movements of the components are described, the movement in the Z-axis positive-direction is also referred to as upward movement, while the movement in the Z-axis negative-direction is also referred to as downward movement.

The machine tool 10 has the spindle 12, the spindle head 16, a column 22, and an automatic tool changer 30. The spindle 12 is provided on the spindle head 16 rotatably about a rotary axis parallel to the Z-axis direction. A spindle motor 18 is provided on the spindle head 16, and the spindle 12 is rotationally driven by the spindle motor 18. A tool holder 20 with the cutting tool 14 attached thereto is inserted into an insertion hole (not shown) provided at an end of the spindle 12. The tool holder 20 and the cutting tool 14 are rotated integrally with rotation of the spindle 12.

The spindle head 16 is provided on the column 22 movably in the Z-axis direction. The spindle head 16 is connected movably together with a nut of a ball screw (not shown) installed in the column 22. When a screw shaft (not shown) of the ball screw is rotationally driven by a servomotor 24, the spindle head 16 is moved together with the nut in the Z-axis direction.

The automatic tool changer 30 is provided on a side surface in the Y-axis negative-direction of an arm portion (fixed portion) 28 which extends from the column 22 in the Y-axis negative-direction. The automatic tool changer 30 is a device that automatically changes the cutting tool 14 attached to the spindle 12. The automatic tool changer 30 has a turret 32 rotatably provided on the arm portion 28. A plurality of grips 34 are provided on an outer circumferential side of the turret 32. The grips 34 each detachably hold the tool holder 20 to which the cutting tool 14 is attached. When the cutting tool 14 on the spindle 12 is changed, the turret 32 is connected to the spindle 12 through gears (not shown), and the spindle 12 is rotated to thereby swivel the turret 32, whereby a desired cutting tool 14 is attached to the spindle 12.

A machining area S of the machine tool 10 is covered with a cover (interference portion) 36. The spindle 12, the spindle head 16, the column 22, the automatic tool changer 30, and the like are arranged within the cover 36. An opening portion (not shown) is formed at a portion of a ceiling 38 of the cover 36. When the spindle head 16 is moved upward, a portion of the spindle motor 18 is exposed to the outside of the cover 36.

[Configuration of Cutting Fluid Supply Mechanism]

The machine tool 10 has a cutting fluid supply mechanism 40. The cutting fluid supply mechanism 40 ejects a cutting fluid toward the cutting tool 14 and the workpiece when the workpiece is cut with the cutting tool 14. Thus, the cutting tool 14 and the workpiece are cooled, and chips are removed. The cutting fluid supply mechanism 40 pumps up the cutting fluid stored in a cutting fluid storage tank (not shown) by a pump (not shown) and sends the cutting fluid through a cutting fluid supply pipe 42 to eject the cutting fluid from nozzles 44.

The cutting fluid supply pipe 42 has a first supply pipe 46, a second supply pipe (line-shaped member) 48, a third supply pipe 50 and a plurality of nozzles 44. The first supply pipe 46 is connected at its one end to the pump and is fixed at the other end to a side surface in the X-axis positive-direction of the arm portion 28.

The second supply pipe 48 is connected at its one end to the first supply pipe 46 and at the other end to the third supply pipe 50. A connection portion between the second supply pipe 48 and the first supply pipe 46 is located at a higher position (on the Z-axis positive-direction side) than a connection portion between the second supply pipe 48 and the third supply pipe 50. The second supply pipe 48 is attached to the first supply pipe 46 so as to extend in the Y-axis negative-direction, and its intermediate portion is bent and curved. Then, the second supply pipe 48 is attached, from the Z-axis positive-direction side, to the third supply pipe 50 which is fixed to the spindle head 16 on the Z-axis negative-direction side relative to the first supply pipe 46. In the state of the second supply pipe 48 being connected to the first supply pipe 46 and the third supply pipe 50, the piping shape (piping path) of the second supply pipe 48 changes in accordance with movement of the spindle head 16 in the Z-axis direction. The second supply pipe 48 is made of a material having such elasticity that the second supply pipe 48 may not hang down toward the Z-axis negative-direction side beyond the third supply pipe 50.

The third supply pipe 50 is fixed to a side surface of the spindle head 16 on the X-axis positive-direction side. The third supply pipe 50 firstly extends in the Z-axis negative-direction and then extends in the X-axis negative-direction along a side surface of the spindle head 16 on the Z-axis negative-direction side (i.e. along a lower surface of the spindle head 16). On the Z-axis negative-direction side (i.e., on a lower side) of the spindle head 16, the plurality of nozzles 44 are provided on the third supply pipe 50 so as to be juxtaposed in the X-axis direction. The nozzles 44 extend from the third supply pipe 50 toward the spindle 12. The nozzles 44 are each made of a resin material, and the piping shape of each nozzle 44 (piping arrangement) is freely adjustable by the operator.

[Configuration of Friction Reduction Mechanism]

Figure 4:
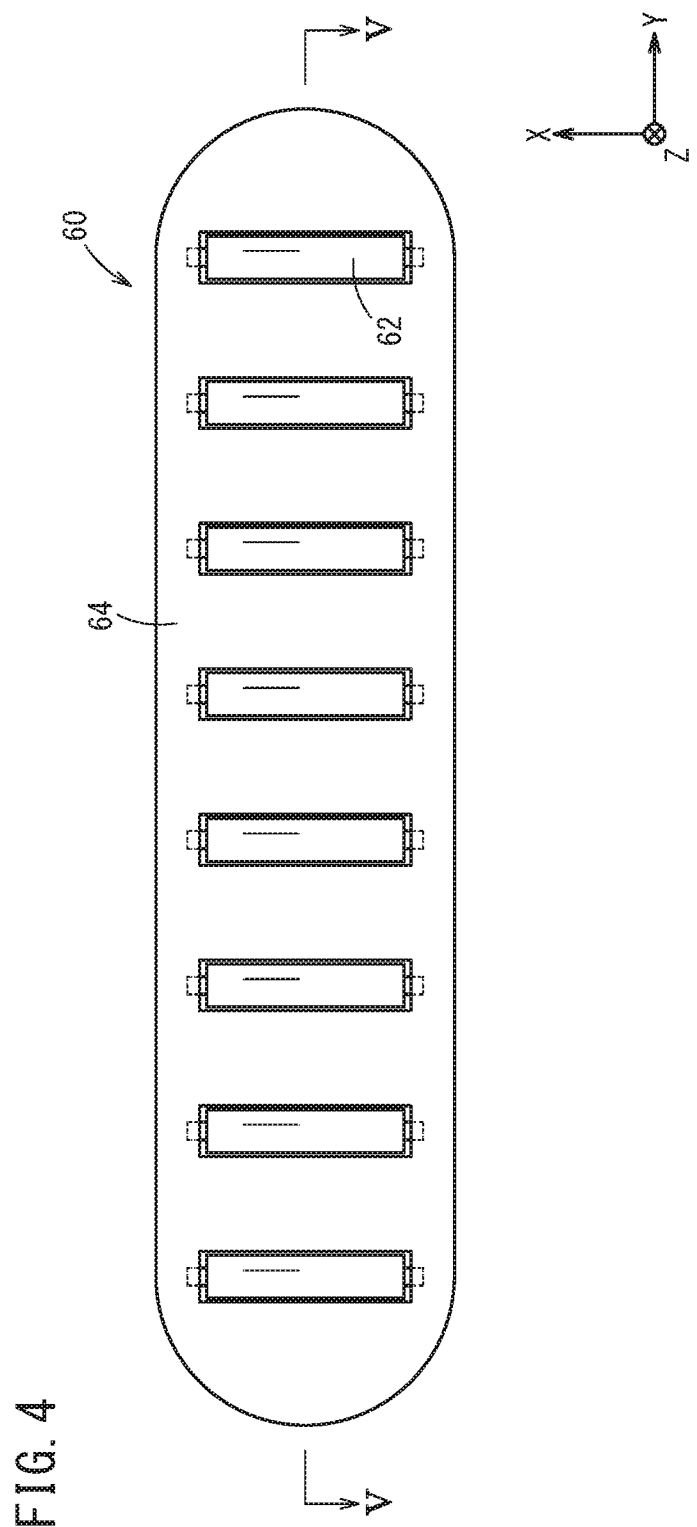
FIG. 4 is a view showing a friction reduction mechanism of the first embodiment, when viewed from a Z-axis negative-direction side (i.e., from a lower side)
Figure 5:
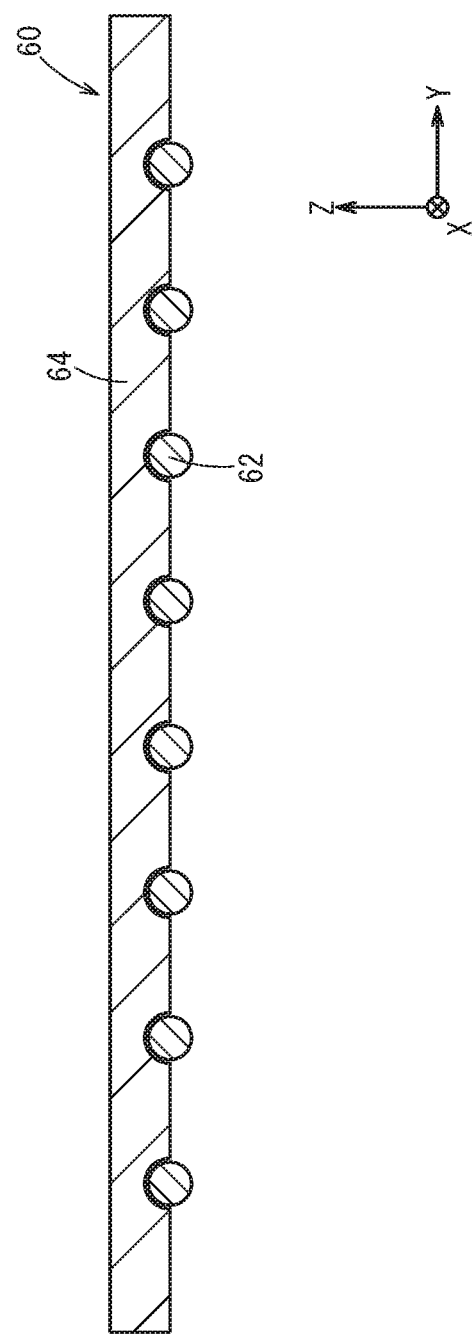
FIG. 5 is a sectional view of the friction reduction mechanism taken along the V-V line in FIG. 4.

The ceiling 38 of the cover 36 has a friction reduction mechanism 60 at a position which overlaps with the second supply pipe 48 in the X-axis direction and the Y-axis direction. FIG. 4 is a view of the friction reduction mechanism 60 as viewed from the Z-axis negative-direction side (i.e., from a lower side). FIG. 5 is a sectional view of the friction reduction mechanism 60 taken along the V-V line in FIG. 4.

The friction reduction mechanism 60 has a plurality of rollers (friction reduction portions) 62 and a roller retainer 64. The rollers 62 are retained by the roller retainer 64 rotatably about respective rotary axes parallel to the X-axis. Each of the rollers 62 is retained with a portion of its outer peripheral surface protruding toward the Z-axis negative-direction side (i.e., toward the lower side) beyond a surface of the roller retainer 64 on the Z-axis negative-direction side (i.e., beyond the lower surface).

[Movement of Cutting Fluid Supply Pipe]

With reference to FIGS. 1 to 3, description will be given regarding the movement of the second supply pipe 48 of the cutting fluid supply pipe 42 in connection with the movement of the spindle head 16 in the Z-axis direction. In the state that the spindle head 16 is placed at a lowered position, the second supply pipe 48 is separated from the ceiling 38, as shown in FIG. 1. When the spindle head 16 is moved upward in the direction to approach the arm portion 28, as shown in FIG. 2, the second supply pipe 48 is bent at the connection portion with the first supply pipe 46 serving as a fulcrum, and then the intermediate portion of the second supply pipe 48 is raised as a whole, so that the intermediate portion is brought into abutment against the friction reduction mechanism 60 provided on the ceiling 38.

When the spindle head 16 is further moved upward to come closer to the arm portion 28, the upward movement of the intermediate portion of the second supply pipe 48 is prevented by the friction reduction mechanism 60 as shown in FIG. 3, and the portion of the second supply pipe 48 abutting against the friction reduction mechanism 60 is moved toward the Y-axis negative-direction side (i.e., leftward in FIG. 3) along the friction reduction mechanism 60. At this time, because the second supply pipe 48 is moved in the state of abutment against the rollers 62 of the friction reduction mechanism 60, it is possible to reduce the friction acting on the second supply pipe 48 in comparison with a case that the second supply pipe 48 is moved in direct abutment against a surface portion of the ceiling 38.

[Operational Effects]

Conventionally, when the spindle head 16 is moved upward, the second supply pipe 48 is brought into abutment against the surface portion of the ceiling 38 of the cover 36, and thereafter in this abutment state, the second supply pipe 48 is slid along the ceiling 38. Thus, severe abrasion occurs at a portion of the second supply pipe 48 abutting against the ceiling 38, and hence, the second supply pipe 48 is liable to be damaged at an early stage. If the position of the ceiling 38 were heightened, it would be possible to avoid the abutment of the second supply pipe 48 against the ceiling 38. However, this would give rise to a problem that the machine tool 10 increases in size.

To avoid this, in the present embodiment, the rollers 62 are provided at the portion of the ceiling 38 against which the second supply pipe 48 is brought into abutment. Because the second supply pipe 48 is moved in the abutment state against the rollers 62, it is possible to reduce the friction acting on the second supply pipe 48 in comparison with a case that the second supply pipe 48 is slid in the abutment state against the surface portion of the ceiling 38. Accordingly, it is possible to suppress abrasion and damage of the second supply pipe 48, and thus the life time of the second supply pipe 48 can be extended.

[Second Embodiment]

Figure 6:
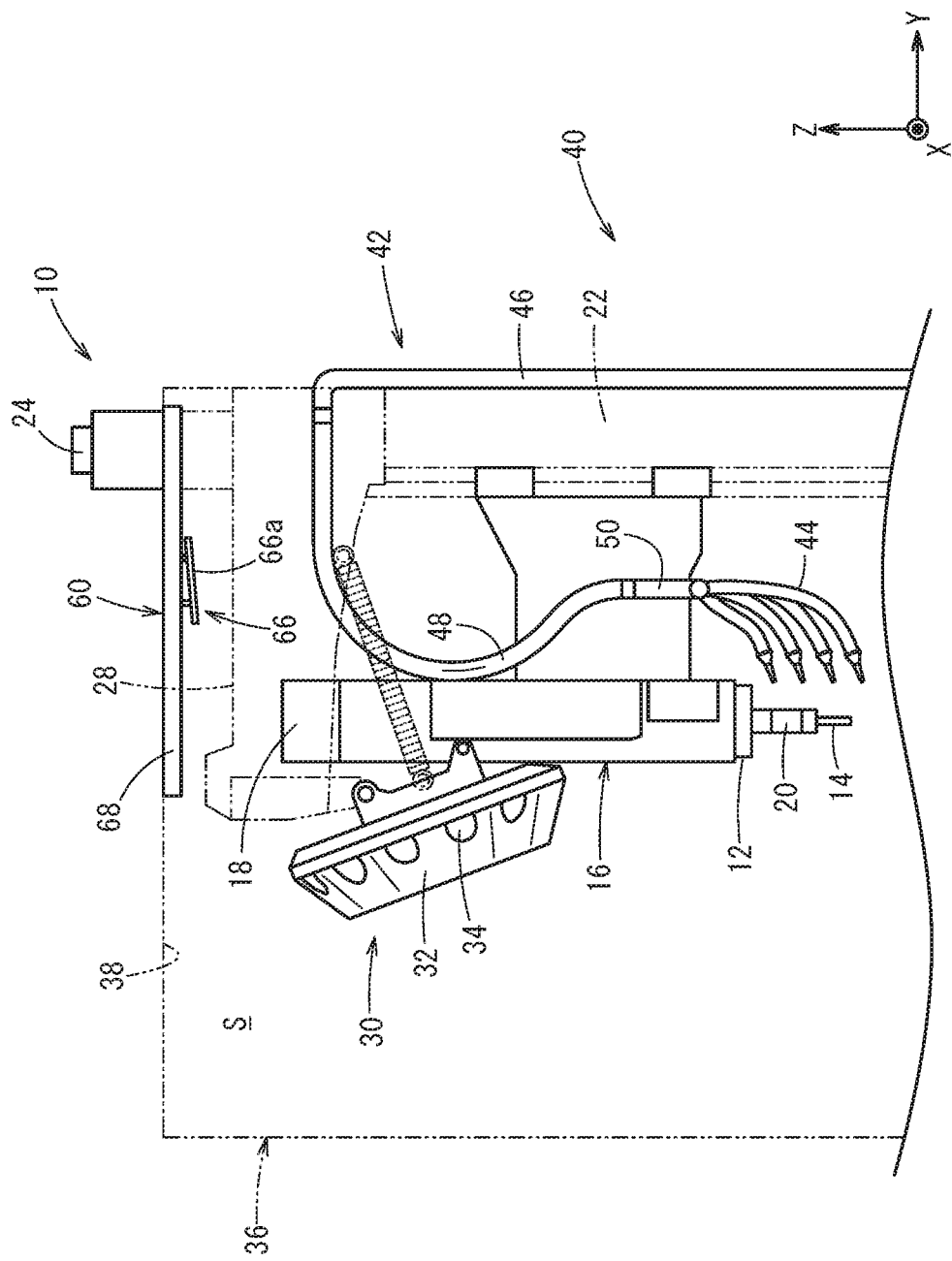
FIG. 6 is a schematic view showing a vicinity of a spindle head of a machine tool according to a second embodiment of the present invention.
Figure 7:
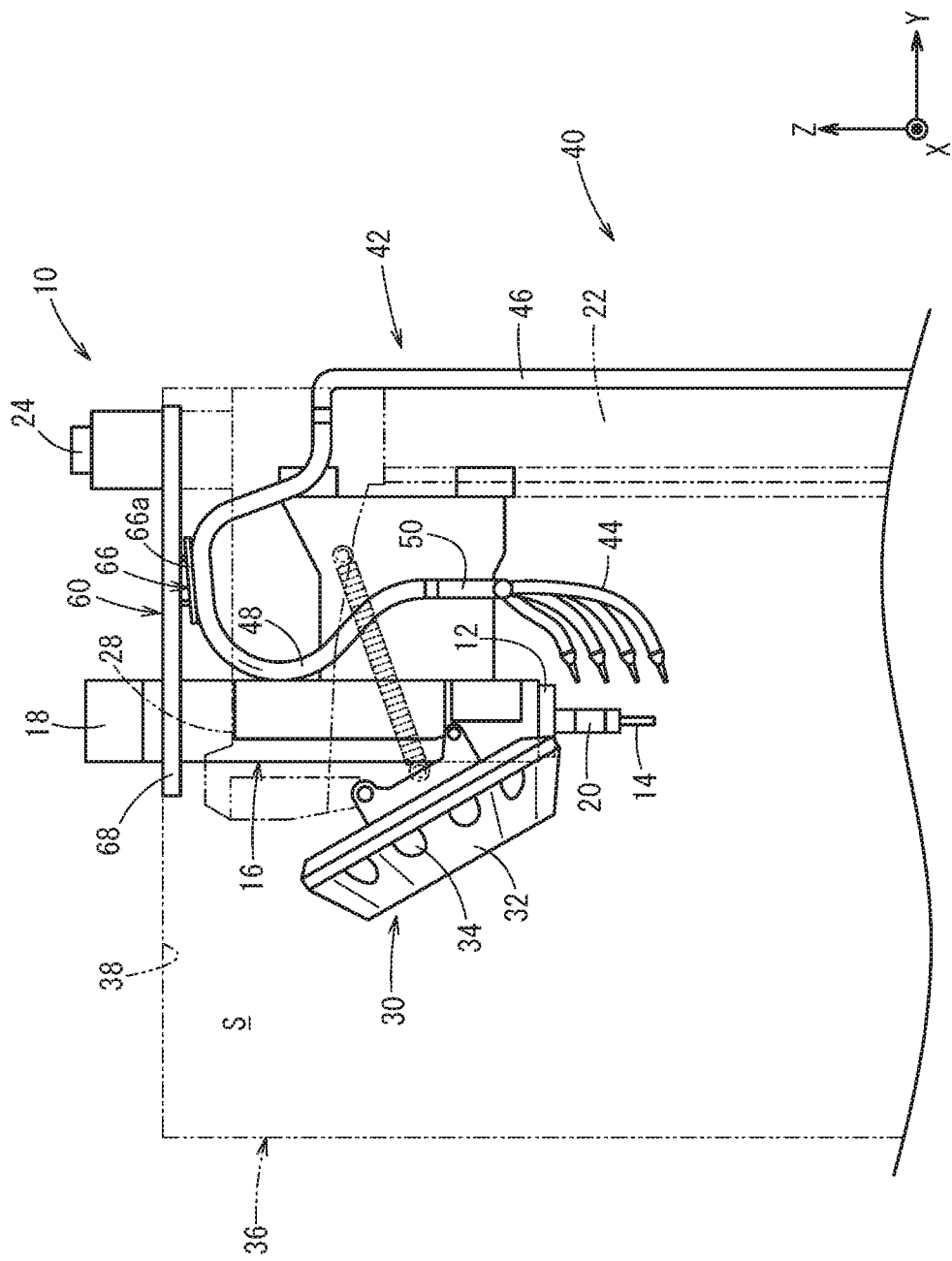
FIG. 7 is a schematic view showing the spindle head of the machine tool of the second embodiment.
Figure 8:
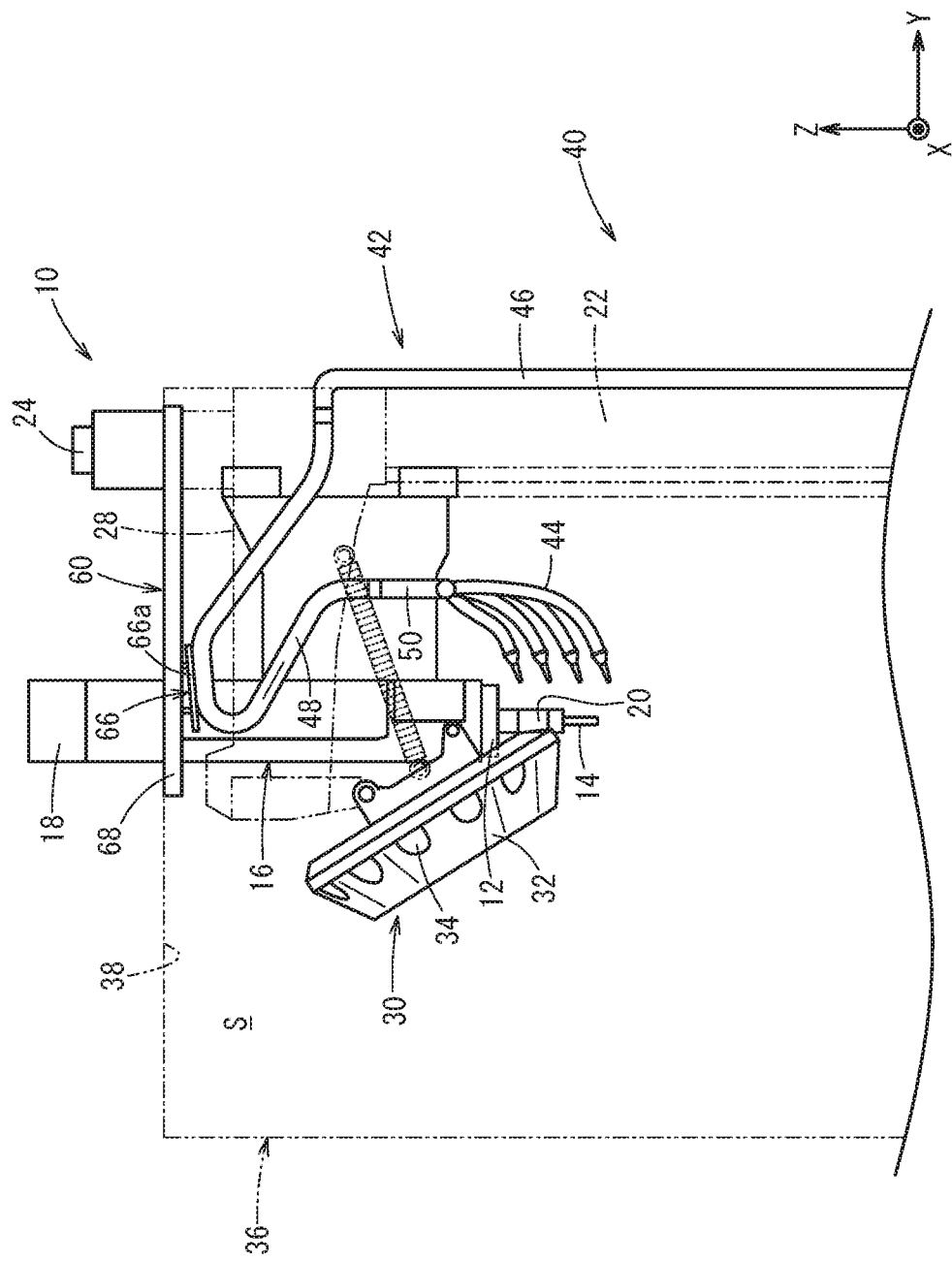
FIG. 8 is a schematic view showing the vicinity of the spindle head of the machine tool of the second embodiment.

A machine tool 10 of a second embodiment will be described. FIGS. 6 to 8 are schematic views showing the vicinity of a spindle head 16 of the machine tool 10. FIG. 6 is a view showing a state that the spindle head 16 is lowered for machining a workpiece with a cutting tool 14. FIG. 8 is a view showing a state that the spindle head 16 is lifted for retracting the cutting tool 14 from the workpiece. FIG. 7 is a view showing an intermediate state of the spindle head 16 being moved from the state of FIG. 6 to the state of FIG. 8 or from the state of FIG. 8 to the state of FIG. 6. FIGS. 6 to 8 are each a view of the machine tool 10 as viewed from one side.

In the following description, the right-left direction in FIGS. 6 to 8 is defined as a Y-axis direction, and the rightward direction in the figures is defined as a positive-direction. Further, a direction perpendicular to the Y-axis in a horizontal plane is defined as an X-axis direction, and a direction that is directed out of the drawing sheet is defined as a positive-direction. Furthermore, a direction perpendicular to the X-axis and the Y-axis is defined as a Z-axis direction, and an upward direction in the drawing is defined as a positive-direction. Further, in describing the movement of each component, the movement in the Z-axis positive-direction is also referred to as upward movement, while the movement in the Z-axis negative-direction is also referred to as downward movement. The machine tool 10 of the second embodiment differs from the machine tool 10 of the first embodiment in the configuration of the friction reduction mechanism 60.

[Configuration of Friction Reduction Mechanism]

A ceiling 38 of a cover 36 has a friction reduction mechanism 60 at a position which overlaps with a second supply pipe 48 in the X-axis direction and the Y-axis direction. FIG. 9A is a view of the friction reduction mechanism 60 as viewed from the Z-axis positive-direction side (i.e., from the upper side) and shows a state that a table (friction reduction portion) 66 of the friction reduction mechanism 60 is located at an initial position. FIG. 9B is a view of the friction reduction mechanism 60 as viewed from the Z-axis positive-direction side and shows a state that the table 66 of the friction reduction mechanism 60 is displaced from the initial position. FIG. 10A is a sectional view of the friction reduction mechanism 60 taken along the XA-XA line in FIG. 9A. FIG. 10B is a sectional view of the friction reduction mechanism 60 taken along the XB-XB line in FIG. 9B.

The friction reduction mechanism 60 of the second embodiment enables the second supply pipe 48 to be moved in the Y-axis direction in abutment state against the table 66, so that the friction acting on the second supply pipe 48 can be reduced in comparison with a case that the second supply pipe 48 is moved in a state of direct abutment against the ceiling 38.

The friction reduction mechanism 60 has the table 66 and a guide member 68. The guide member 68 has, at its bottom portion 68a, slit-shaped guides 68b extending in the Y-axis direction. The table 66 is provided slidably along the guides 68b. The table 66 has its top plate 66a slanting relative to a direction (the Y-axis direction) in which the guides 68b extend. A Y-axis negative-direction side of the top plate 66a is located closer to the Z-axis negative-direction side than a Y-axis positive-direction side thereof, that is, one end of the top plate 66a on the Y-axis negative-direction side is located closer to the Z-axis negative-direction side than the other end thereof on the Y-axis positive-direction side (i.e., the Y-axis negative-direction side of the top plate 66a is lower in level than the Y-axis positive-direction side thereof). The table 66 is equipped with a coil spring (urging member) 70. One end of the coil spring 70 is fixed to an end portion of the guide member 68 on the Y-axis positive-direction side, and the other end thereof is attached to the table 66. The coil spring 70 urges the table 66 toward the Y-axis positive-direction side when the table 66 is moved toward the Y-axis negative-direction side.

[Movement of Cutting Fluid Supply Pipe]

With reference to FIGS. 6 to 8, description will be given regarding the movement of the second supply pipe 48 of the cutting fluid supply pipe 42 in connection with the movement of the spindle head 16 in the Z-axis direction. In a state that the spindle head 16 is lowered, as shown in FIG. 6, the second supply pipe 48 is separated away from the ceiling 38. When the spindle head 16 is moved upward in the direction to come close to the arm portion 28, as shown in FIG. 7, the second supply pipe 48 is bent at the connection portion with the first supply pipe 46 serving as a fulcrum, and then the intermediate portion of the second supply pipe 48 is raised as a whole, so that the intermediate portion abuts against the table 66 of the friction reduction mechanism 60.

When the spindle head 16 is further moved upward to come closer to the arm portion 28, the upward movement of the intermediate portion of the second supply pipe 48 is prevented by the table 66, and the portion of the second supply pipe 48 abutting against the table 66 is moved toward the Y-axis negative-direction side along the friction reduction mechanism 60, as shown in FIG. 8. At this time, because the second supply pipe 48 is moved together with the table 66, it is possible to reduce the friction acting on the second supply pipe 48 in comparison with a case that the second supply pipe 48 is moved in a state of direct abutment against the surface portion of the ceiling 38.

[Operational Effects]

In the second embodiment, because the second supply pipe 48 is moved together with the table 66, it is possible to reduce the friction acting on the second supply pipe 48 in comparison with a case that the second supply pipe 48 slides in the state of abutment against the surface portion of the ceiling 38. Thus, it is possible to extend the life time of the second supply pipe 48 by suppressing the friction and damage of the second supply pipe 48.

Further, the top plate 66a of the table 66 is slanted relative to the direction (the Y-axis direction) in which the guides 68b extend. Thus, a force causing the second supply pipe 48 to move in the Z-axis positive-direction (i.e., upward) is converted into a force to move the second supply pipe 48 in the Y-axis negative-direction. As a result, the second supply pipe 48 can be smoothly moved together with the table 66 in the Y-axis direction.

[Other Embodiments]

As described above, the present invention has been described based on the embodiments. However, the present invention is not limited to the aforementioned embodiments. Needless to say, it is possible to add various modifications or improvements to the foregoing embodiments. It is obvious from the scope of the claims that other modes including such modifications or improvements can be included within the technical scope of the present invention.

Although in the first and second embodiments, the friction acting on the second supply pipe 48 is reduced by the rollers 62 or the table 66, it may likewise be possible to reduce the friction acting on power cables or the like which interfere with any other member. Further, a member with which the second supply pipe 48 interferes is not limited to the cover 36 and may also be any other member.

Further, the present invention may also be applicable to a configuration wherein one end of the second supply pipe 48 is fixed to the column 22 and the other end is fixed to a worktable (moving portion) which is movable on a plane parallel to the X-Y plan. In this case, the rollers 62 or the table 66 may be provided on a side surface of the cover 36.

Further, the machine tool 10 is not limited to a vertical machining center and may be a horizontal machining center. Further, the machine tool 10 is not limited to the machining center and may be a turning center or an electrical discharge machine.

[Technical Concept Obtained from Embodiments]

A technical concept which can be grasped from the foregoing embodiments will be described as follows.

A machine tool (10) includes a moving portion (16) configured to move within a machining area (S), a fixed portion (28) provided within the machining area (S), a line-shaped member (48) having elasticity, the line-shaped member (48) having one end side fixed to the moving portion (16) and the other end side fixed to the fixed portion (28), and an interference portion (36) provided within the machining area (S), wherein, when the moving portion (16) is moved in a direction to come close to the fixed portion (28), the line-shaped member (48) is bent and then a portion of the line-shaped member (48) is brought into abutment against the interference portion (36), wherein a friction reduction portion (62, 66) is provided at a portion of the interference portion (36) against which the line-shaped member (48) is brought into abutment, and is configured to reduce friction between the interference portion (36) and the line-shaped member (48) when the line-shaped member (48) is moved relative to the interference portion (36) in a state of being held in abutment against the interference portion (36). With this configuration, it is possible to extend the life time of the line-shaped member (48) by suppressing the abrasion and damage of the line-shaped member (48).

In the above-described machine tool (10), the friction reduction portions (62, 66) may include rollers (62) provided at the interference portion (36). With this construction, it is possible to reduce the friction acting on the line-shaped member (48) with a simple structure.

In the above-described machine tool (10), the friction reduction portion (62, 66) may include a table (66) provided slidably on a guide (68b) provided at the interference portion (36). With this construction, because the table (66) is moved together with the line-shaped member (48), it is possible to reduce the friction acting on the line-shaped member (48).

In the above-described machine tool (10), a surface of the table (66) against which the line-shaped member (48) is brought into abutment may be slanted so that one end portion of the surface on a side of a direction in which the line-shaped member (48) moves relative to the interference portion (36) when the moving portion (16) is moved in a direction to come close to the fixed portion (28) is located to be closer to the line-shaped member (48) than an opposite end portion of the surface. With this structure, it is possible to convert the force acting on the table (66) from the line-shaped member (48) into a force in the moving direction of the table (66), and hence, it is possible to smoothly move the line-shaped member (48) together with the table (66).

In the above-described machine tool (10), there may be further provided an urging member (70) configured to urge the table (66) in a direction opposite to a direction in which the table (66) is moved along the guide (68b) by abutment of a portion of the line-shaped member (48) against the table (66) when the moving portion (16) is moved in the direction to come close to the fixed portion (28). With this construction, when the moving portion (16) is moved in a direction away from the interference portion (36) to separate the line-shaped member (48) from the table (66), it is possible to automatically return the table (66) to an original position.

In the above-described machine tool (10), the moving portion (16) may be a spindle head (16) configured to move in a vertical direction, the line-shaped member (48) may be a supply pipe (48) configured to supply cutting fluid, and the interference portion (36) may be a cover (36) configured to cover the machining area (S). With this structure, it is possible to extend the life time of the supply pipe (48) by suppressing the abrasion and damage of the supply pipe (48).

In the above-described machine tool (10), the moving portion (16) may be a worktable configured to move in a horizontal direction, the line-shaped member (48) may be a supply pipe (48) configured to supply cutting fluid, and the interference portion (36) may be a cover (36) configured to cover the machining area (S). With this construction, it is possible to extend the life time of the supply pipe (48) by suppressing the abrasion and damage of the supply pipe (48).

What is claimed is:

1. A machine tool comprising:
a moving portion configured to move within a machining area;
a fixed portion provided within the machining area;
a line-shaped member having elasticity, the line-shaped member having one end side fixed to the moving portion and another end side fixed to the fixed portion; and
an interference portion provided within the machining area, wherein, when the moving portion is moved in a direction to come close to the fixed portion, the line-shaped member is bent and then a portion of the line-shaped member is brought into abutment against the interference portion;
wherein a friction reduction portion is provided at a portion of the interference portion against which the line-shaped member is brought into abutment, and is configured to reduce friction between the interference portion and the line-shaped member when the line-shaped member is moved relative to the interference portion in a state of being held in abutment against the interference portion, wherein:
the moving portion is a spindle head configured to move in a vertical direction;
the line-shaped member is a supply pipe configured to supply cutting fluid; and
the interference portion is a cover configured to cover the machining area.

2. The machine tool according to claim 1, wherein:
the friction reduction portion comprises rollers provided at the interference portion.

3. The machine tool according to claim 1, wherein:
the friction reduction portion comprises a table provided slidably on a guide provided at the interference portion.

4. The machine tool according to claim 3, wherein:
a surface of the table against which the line-shaped member is brought into abutment is slanted so that one end portion of the surface on a side of a direction in which the line-shaped member moves relative to the interference portion when the moving portion is moved in the direction to come close to the fixed portion is located to be closer to the line-shaped member than an opposite end portion of the surface.

5. The machine tool according to claim 3, further comprising:
an urging member configured to urge the table in a direction opposite to a direction in which the table is moved along the guide by abutment of a portion of the line-shaped member against the table when the moving portion is moved in the direction to come close to the fixed portion.

6. A machine tool comprising:
a moving portion configured to move within a machining area;
a fixed portion provided within the machining area;
a line-shaped member having elasticity, the line-shaped member having one end side fixed to the moving portion and another end side fixed to the fixed portion; and
an interference portion provided within the machining area, wherein, when the moving portion is moved in a direction to come close to the fixed portion, the line-shaped member is bent and then a portion of the line-shaped member is brought into abutment against the interference portion;
wherein a friction reduction portion is provided at a portion of the interference portion against which the line-shaped member is brought into abutment, and is configured to reduce friction between the interference portion and the line-shaped member when the line-shaped member is moved relative to the interference portion in a state of being held in abutment against the interference portion, wherein:
the moving portion is a worktable configured to move in a horizontal direction;
the line-shaped member is a supply pipe configured to supply cutting fluid; and
the interference portion is a cover configured to cover the machining area.

7. The machine tool according to claim 6, wherein:
the friction reduction portion comprises rollers provided at the interference portion.

8. The machine tool according to claim 6, wherein:
the friction reduction portion comprises a table provided slidably on a guide provided at the interference portion.

9. The machine tool according to claim 8, wherein:
a surface of the table against which the line-shaped member is brought into abutment is slanted so that one end portion of the surface on a side of a direction in which the line-shaped member moves relative to the interference portion when the moving portion is moved in the direction to come close to the fixed portion is located to be closer to the line-shaped member than an opposite end portion of the surface.

10. The machine tool according to claim 8, further comprising:
an urging member configured to urge the table in a direction opposite to a direction in which the table is moved along the guide by abutment of a portion of the line-shaped member against the table when the moving portion is moved in the direction to come close to the fixed portion.

* * * * *